United States Patent [19]

Taylor

[11] Patent Number: 5,265,852
[45] Date of Patent: Nov. 30, 1993

[54] GAS SPRING WITH GAS PASSAGEWAYS IN THE ASSEMBLY HOUSING AND PISTON ROD

[75] Inventor: Samuel M. Taylor, Belleville, Mich.

[73] Assignee: Die, Mold & Automation Components, Inc., Dearborn, Mich.

[21] Appl. No.: 771,362

[22] Filed: Oct. 1, 1991

[51] Int. Cl.⁵ .............................. F16F 9/02; F16F 9/34
[52] U.S. Cl. .................... 267/119; 267/130; 188/322.17
[58] Field of Search ................ 267/1.5, 118, 119, 124, 267/129, 130, 127, 64.11, 68, 75; 188/322.17

[56] References Cited

U.S. PATENT DOCUMENTS

| | | | |
|---|---|---|---|
| 4,342,448 | 8/1982 | Wallis | 267/119 |
| 4,447,047 | 5/1984 | Newell | 267/118 |
| 4,741,518 | 5/1988 | Wallis | 267/119 X |
| 4,792,128 | 12/1988 | Holley | 267/118 |
| 4,838,527 | 6/1989 | Holley | 267/119 X |
| 5,088,698 | 2/1992 | Wallis | 267/119 |

Primary Examiner—Robert J. Oberleitner
Assistant Examiner—Josie A. Ballato
Attorney, Agent, or Firm—Dykema Gossett

[57] ABSTRACT

A gas spring assembly includes a cylindrical tube, a piston slidable within the tube and defining a gas pressure chamber, a rod extending from the piston through one end of the tube, and a seal assembly including an axially compressible, consumable seal for preventing escape of gas between the rod and the tube. A stop formed in the inner wall of the tube is adapted to engage the piston to limit the extension of the rod to a constant, maximum value, regardless of axial compression and consumption of the seal. The seal assembly is disposed between the stop and one end of the tube, opposite the piston, and includes gas passageway allowing pressurized gas to act on one end of the seal assembly to thereby bias the seal assembly toward one end of the tube.

11 Claims, 2 Drawing Sheets

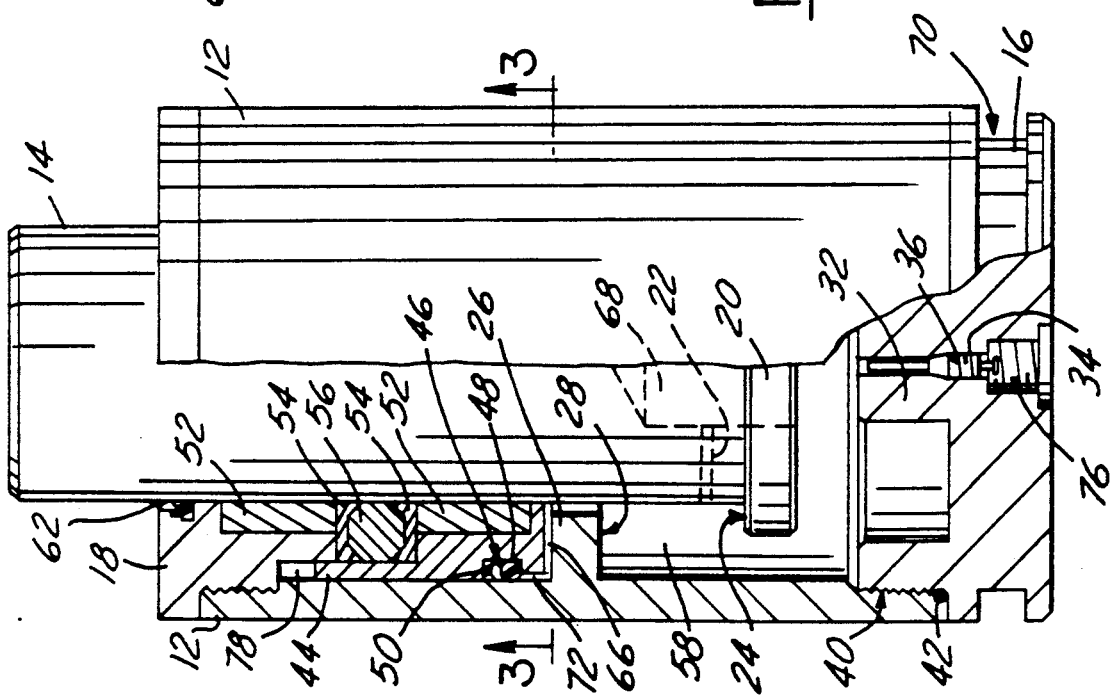

GAS SPRING WITH GAS PASSAGEWAYS IN THE ASSEMBLY HOUSING AND PISTON ROD

TECHNICAL FIELD

The present invention generally relates to fluid operated, piston/cylinder assemblies, and deals more particularly with a gas operated piston/cylinder typically employed as a spring assembly in which a fixed volume of gas within the cylinder normally biases the piston to an extended position but is compressed upon retraction of the piston.

BACKGROUND ART

So-called gas spring assemblies have numerous applications in the tooling industry, and are typically integrated into various types of specialty tooling, dies and molds. For example die springs may be used in stripping operations, to even out pressures on stripper plates; in progressive dies used for drawing operations; for forming in two directions; for cam returns, in inverted drawing operations; and, in floating punch operations. These gas spring assemblies typically comprise an outer tube or cylinder within which there is slidable a piston or rod defining a gas pressure chamber which is normally filled with a fixed volume of a suitable gas, such as nitrogen. The fixed quantity of gas within the pressure chamber normally biases the piston/rod outwardly, but of course is yieldable to allow retraction of the spring/rod in a spring-like manner. The outer end of the rod bears upon various tooling, dies, or molds as discussed above. In many applications, it is important that the extended length of the rod relative to the cylinder remain constant since other dimensions of the tooling, die, molds or the equipment upon which they are mounted, are dependent upon the extended length of the spring assembly.

Prior spring assemblies of the type discussed above often employ a special type of seal to prevent escape of the pressurized gas along the outer walls of the rod or cylinder. These seals typically comprise a relatively soft, flowable seal packing surrounding the piston/rod, composed of PTFE and silicone lubricant, captured between a pair of opposing seal caps. The soft seal packing material is biased into sealing engagement with the piston/rod when an axial force is applied to the seal which results in axial compression of the seal caps. Repeated operation of the gas spring assembly over time results in axial compression and eventual consumption of the seal because of the consumable nature of the soft sealing material. Consequently, in the past, seals of the type described above have been mounted in a seal housing surrounding the piston/rod which is arranged such that it shifts axially to compensate for axial compression of the soft seal packing material. However, because it is necessary to expose one end of the seal housing to gas pressure, this end of the seal housing is also exposed to the piston (or a shoulder of the piston) which actually engages the seal housing when the piston/rod is fully extended. Because the end of the seal housing acts as an outer stop to limit the maximum outward extension of the rod, the extension length of the rod eventually increases as the seal housing axially shifts over time as the seal packing material is consumed, thus diminishing the operational accuracy of the gas spring assembly.

Prior gas spring assemblies also possess a number of other shortcomings which are subject to improvement, including the need for improving manufacturing assembly of the gas spring, the ability to quickly disassemble the gas spring for maintenance and the need to provide a means for adjusting initial axial loading of the seal.

The present invention is directed toward providing solutions to each of the deficiencies mentioned above.

It is therefore a primary object of the present invention to provide a gas spring assembly of the general type described above which is not subject to degradation of accuracy due to alterations in the maximum extended length of the spring rod.

Another object of the invention is to provide a gas spring assembly as mentioned above which substantially reduces the need for maintenance and/or facilitates maintenance of the gas spring assembly due to wear.

A further object of the invention is to provide a gas spring assembly as mentioned above which is easy to assemble and disassemble.

A still further object of the present invention is to provide a gas spring assembly of the type using a consumable, compressible seal in which the cylinder/rod is precluded from axially bearing on either the soft seal or the seal housing containing the seal.

SUMMARY OF THE INVENTION

According to the present invention, a gas spring assembly is provided comprising a cylindrical tube, a piston slidable within the tube and including a rod extending through one end of the tube, wherein the piston and the tube define a pressurized gas chamber for containing a fixed quantity of pressurized gas which normally biases the rod to slide to an extended position. A seal assembly within the tube is provided to provide an essentially gas tight seal between the piston rod and the tube. Stop means provided within and intermediate the opposite ends of the tube engage and limit the sliding movement of the piston toward one end of the tube, and thus prevent bearing of the piston upon the seal housing. The seal housing is disposed between the stop means and an outer end of the tube, and there is a gap provided which allows axial shifting of the seal housing as a soft seal packing is consumed over time with use of the gas spring assembly. Passageway means are provided within the gas spring assembly to permit pressurized gas within the chamber to bear upon one end of the seal housing, thereby to axially compress the soft seal material in order that the latter flows radially into sealing engagement with the rod. The passageway means includes a first axial passageway extending between the stop means and the rod, and a plurality of second, radially extending passageways between the stop and one end of the seal housing. The second passageways are preferably formed as circumferentially-spaced, radial grooves in the end of the seal housing. The opposite ends of the cylindrical tube are sealed by respective closures in the form of caps which are threadably mounted on the tube.

BRIEF DESCRIPTION OF THE DRAWINGS

In the drawings, wherein like components are designated by identical numerals in the various views:

FIG. 2 is a side view of a modified form of the gas spring assembly of the present invention, shown partially in cross-section to review internal details, and depicting the piston rod in an intermediate position of displacement;

FIG. 3 is a sectional view taken along the line 3—3 in FIG. 2; and

FIG. 4 is a fragmentary, cross-section detail view of another embodiment of the invention showing the relationship of the piston rod, stop means and one end of the seal housing.

DETAILED DESCRIPTION OF A PREFERRED EMBODIMENT

Figure 1:
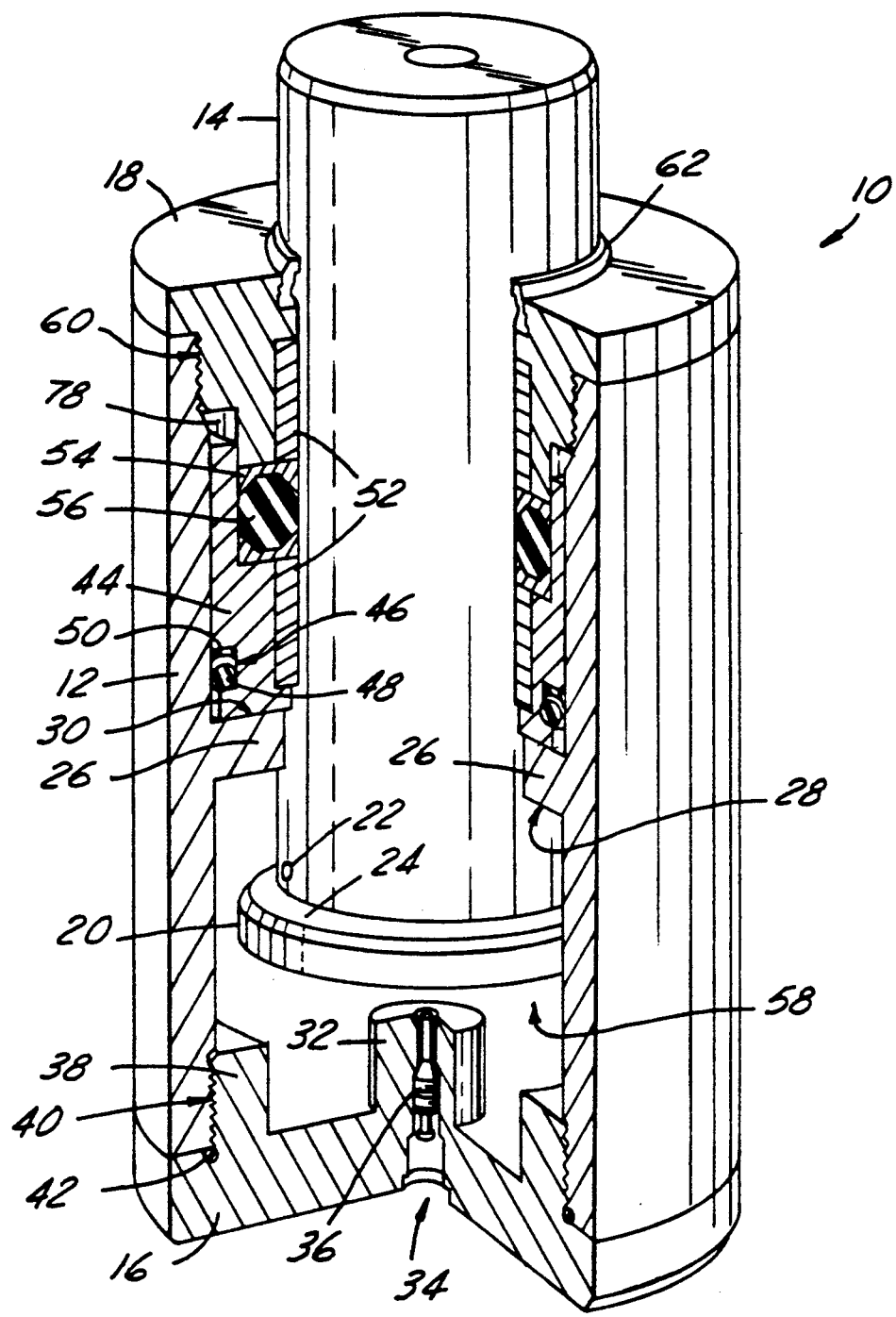
FIG. 1 is a perspective view of a gas spring assembly which forms a preferred embodiment of the invention, partially cutaway to better reveal internal details, and showing the piston rod in an intermediate position of displacement.

Referring now to the drawings, a gas spring assembly forming the preferred embodiment of the present invention is generally indicated by the numeral 10 in FIG. 1. The gas spring assembly 10 broadly comprises an outer, essentially cylindrical tube 12 within which there is provided a slidable, extendable piston rod 14. A first closure in the form of a cap 16 closes one end of the tube 12, and similarly, a second closure in the form of an end cap 18 covers the opposite end of the tube 12. The cap 16 includes an annular land 38 which is secured by threads 40 to the inner side wall of the tube 12. O-ring 42 assures a gas tight fit between the cap 16 at the end of the tube 12.

One end of the tube 12 in combination with the end cap 16 define a gas pressure chamber 58. To allow introduction of gas under pressure into the chamber 58, there is provided centrally in the cap 16, a threaded valve compartment 34 within which there is received a valve core assembly 36. The inner face of the cap 16 is provided with an upstanding valve stem housing 32 to accommodate a portion of the valve core assembly 36. In a slightly modified form of the preferred embodiment shown in FIG. 2, the end cap 16 is provided with a circumferentially extending groove 70 to facilitate clamping and securing the gas spring assembly 10 on tooling or the like. Also, as shown in FIG. 2, it may be seen that threads 76 are provided to permit threadably coupling a source (not shown) of pressurized gas with the valve core assembly 36 when it is desired to charge the spring assembly 10 with gas, such as nitrogen. The other end cap 18 is likewise provided with threads 60 to threadably secure the cap 18 to the inside wall of the tube 12. End cap 18 possesses a central aperture through which the piston rod 14 extends. A flexible rod wiper 62 is secured within a recess in the end cap 18, and conformally engages the piston rod 14.

The piston rod 14 includes a central clearance bore 68 in one end thereof to provide clearance for receiving the valve stem housing 32 when the piston rod 14 is essentially fully retracted within the tube 12, and to provide a gas passageway, for purposes which will be discussed below, when the piston rod 14 is fully extended. The inner end of the piston rod 14 is also provided with a ring 20 of increased diameter, defining a circumferentially extending stop shoulder 24. As best seen in FIG. 2, the radius of the ring 20 is less than that of the inside wall of the tube 12, thus permitting gas to flow freely around the ring 20 so as to completely fill the gas chamber 58. A pair of diametrically opposite gas passages 22 extend radially through the wall of the piston rod 14, into the bore 68.

Intermediate the opposite ends of the tube 12, there is provided an inwardly extending, integral rib 26 of generally rectangular cross-section, which extends completely around the inside wall of the tube 12. As depicted in FIGS. 1 and 2, it may be seen that the rib 26 forms an integral part of the side wall of the tube 12. One side of the rib 26 defines a circumferentially extending stop surface 28 which axially aligns with the stop shoulder 24 on the piston rod 14. The opposite side of the rib 26 likewise defines a stop surface 30 (FIG. 1) which is adapted to engage one end of a seal housing 44. As best seen in FIG. 2 the inside diameter of the rib 26 is less than the outside diameter of the piston rod 14, thus defining a ring-shaped, axial passageway 64 between the rib 26 and the piston rod 14. The gas passages 22 align and communicate with the passageway 64 when the piston rod 14 is fully extended, in engagement with stop surface 28.

The seal housing 44 is adapted to house a seal assembly which will be discussed momentarily, in order to provide a gas tight seal between the piston rod 14 and the inner wall of the tube 12. The outer surface of the seal housing 44 is essentially cylindrical and conformally engages the inside wall of the tube 12. One end of the seal housing 44 is provided with four circumferentially-spaced, radially extending passageways 66 in the form of grooves which communicate with the pressure chamber 58. The passageway grooves 66 likewise communicate with a circumferentially-extending, passageway groove 72 defined between a portion of the end of the seal housing 44 and the inside wall of the tube 12. The passageway 72 communicates with a U-shaped groove 46 within which there is contained an O-ring 48 and an O-ring backup 50 for providing a seal between the outside wall of the seal housing 44 and the inside wall of the tube 12.

The seal housing 44 is provided with a notch within which there is received a seal assembly comprising a pair of opposing seal caps 54 between which there is sandwiched a relatively soft, flowable, flexible seal packing 56 made for example of a PTFE saturated lubricant, such as silicone. The seal packing just mentioned is a product commercially available from, for example, Martin Merkel, Inc. of Cleveland, Ohio identified as SIWAX. The seal assembly is captured between the seal housing 44, the cylindrical outer walls of the piston rod 14 and an inside face of the cap 18. The seal packing 56 functions to provide a gas tight seal against the piston rod 14 as the latter slides into and out of the tube 12. A pair of bronze sleeves 52 are disposed on opposite sides of the seal assembly 54, 56 and slidably engage the piston rod 14. For purposes which will become apparent hereinbelow, a gap 78 is provided between one end of the seal housing 44 and a cutout shoulder of the cap 18.

In operation, a quantity of gas, such as nitrogen, is introduced under pressure through the valve core assembly 36 into the pressure chamber 58, thus biasing the piston rod 14 to slide to an extended position in which the stop shoulder 24 engages stop surface 28 of the rib 26. Pressurized gas within the chamber 58 bears against the inner end of the seal housing 44 as a result of the gas being allowed to flow through passageways 64, 66 and 72. This pressure against the seal housing 44 axially loads the seal housing 44 against the end caps 54, thus forcing the seal packing 56 to flow into tight, gas sealing engagement with the piston rod 14. Likewise, the gas pressure present in passageway 72 biases the O-ring 48 to seal against the inner wall of the tube 12. When the piston rod 14 is fully extended, engaging stop surface 28, gas within chamber 58 flows through clearance bore 68, thence through the gas passages 22 into the passageway 64.

Continued operation of the piston rod eventually results in some degree of consumption of the seal packing 56, thus reducing its volume, allowing the seal housing 44 to be axially displaced toward the end cap 18. This axial movement is accommodated by the circumferentially extending take-up gap 78. Note, however, that this axial displacement of the seal housing 44 has no affect on the displacement limits of the piston rod 14 inasmuch as the extension displacement of piston rod 14 is limited solely by the presence of the stop surface 28, which repeatedly limits such displacement to a constant value.

The seal packing 56, when substantially consumed, may be easily replaced simply by moving the end cap 18 to gain access thereto.

Various alternate arrangements, modifications and variations are contemplated within the present invention. For example, as shown in FIG. 4, rather than integrating the rib 26 (FIG. 2) into the side wall of the tube 12, a separate spring ring 26a may be employed which is received within a U-shape groove provided in the inner side wall of the tube 12.

From the foregoing, it is apparent that the present invention not only provides for the reliable accomplishment of the objects of the invention, but does so in a particularly simple and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A gas spring assembly, comprising:
    a tube having first and second opposite ends;
    a first closure covering said first end of said tube;
    a stop within said tube defined by a lateral extension between the opposite ends of said tube;
    a piston rod slidable within said tube and including a lateral shoulder axially registering and engagable with said stop to limit axial extension of said rod from said tube, said rod, said tube and said first closure defining a gas pressure chamber adjacent said one end of said tube and adapted to be filled with a compressible gas normally biasing said rod toward an extended position;
    a second closure covering the second end of said tube and including an opening therein through which a portion of said rod extends from said tube;
    a seal housing surrounding said rod and axially slidable within said tube, said seal housing being disposed between said stop and said second end of said tube, said seal housing including radial groove means in one end thereof adjacent said stop for receiving compressible gas therein, the compressible gas within said groove means bearing on surface areas of said seal housing to axially bias said seal housing toward said second end of said tube; and,
    a consumable, axially compressible seal captured between said seal housing and said second end of said tube, said seal surrounding and slidably engaging said rod, said seal axially shifting along with said seal housing toward said second end of said tube as said seal is consumed during the operation of said gas spring assembly,
    said second closure bearing axially on said seal housing and including threaded means rotatable to axially displace said second closure toward said seal housing and impose a desired axial load on said seal housing,
    said stop limiting the maximum axial extension of said rod to a constant dimension regardless of axial shifting of said seal housing resulting from consumption of said seal,
    said stop including longitudinally extending gas passageway means therein communicating with said groove means, said piston rod including a gas passageway therein placing said chamber in gas flow communication with said gas passageway means in said stop, whereby said gas is delivered to said radial groove means to apply an axial force on said seal housing in opposition to the axial force applied to said seal housing by said threaded means of said second closure.

2. The gas spring assembly of claim 1, including:
    valve means for introducing said compressible gas into said gas pressure chamber.

3. The gas spring assembly of claim 2, wherein said valve means is mounted in said first closure.

4. The gas spring assembly of claim 3, wherein said valve means extends axially into said gas pressure chamber, and said rod includes a clearance opening in one end thereof for receiving a portion of said valve means therein when said rod is retracted toward said first end of said tube against the biasing influence of said gas.

5. The gas spring assembly of claim 1, wherein said stop is defined as an integral rib portion of the inside wall of said tube.

6. The gas spring assembly of claim 5, wherein said stop extends completely around the circumference of the inside wall of said tube.

7. The gas spring assembly of claim 1, wherein:
    said tube includes a cylindrical inside wall provided with a circumferentially extending groove therein; and
    said stop includes a ring having a first portion thereof captured within said groove and a second portion thereof extending radially inwardly beyond said inside wall and defining said lateral extension.

8. The gas spring assembly of claim 1, wherein said longitudinally extending gas passageway is defined between said stop and said rod.

9. The gas spring assembly of claim 8, including:
    sealing means between said seal housing and the interior wall of said tube for preventing the escape of said gas from said gas pressure chamber; and
    axial gas passageway means placing said sealing means in communication with said radial groove means.

10. The gas spring assembly of claim 8, including a gap between another end of said seal housing and said closure, said gap defining an area into which said seal housing may be displaced under the biasing influence of said gas as said consumable seal shifts toward said second end of said tube as said consumable seal is consumed.

11. The gas spring assembly of claim 1, including a flexible wiper mounted within said second closure and circumferentially engaging said rod.

* * * * *